Patented May 27, 1930

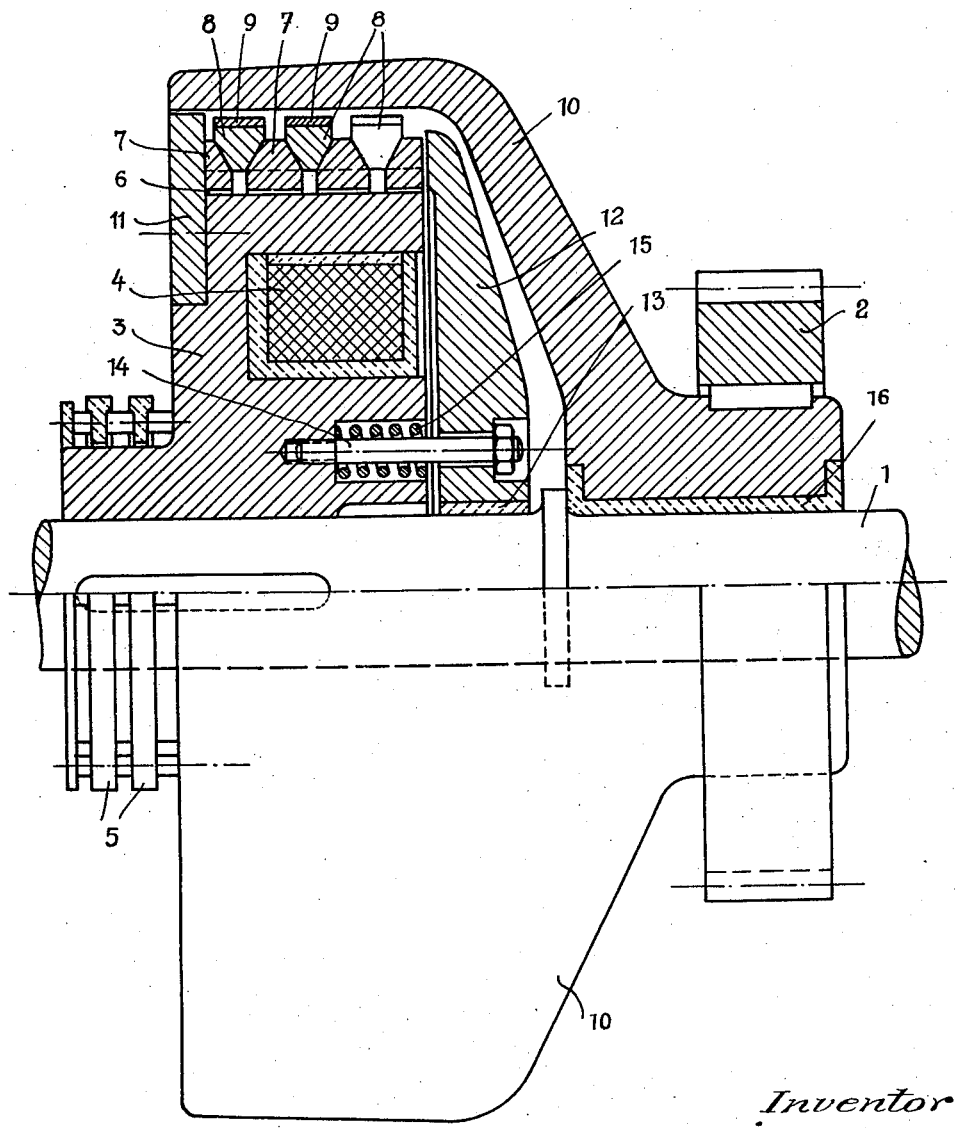

1,760,223

UNITED STATES PATENT OFFICE

BRUNO WITTKUHNS, OF NEW YORK, N. Y., ASSIGNOR TO THE FIRM: MAGNET-WERK G. M. B. H., EISENACH SPEZIALFABRIK FÜR ELEKTROMAGNET-APPARATE, OF EISENACH, THURINGIA, GERMANY

FRICTION COUPLING

Application filed June 25, 1927, Serial No. 201,470, and in Germany June 30, 1926.

My invention relates to friction clutches more particularly of the type provided with friction members which consist of two sets of annular discs or rings each set being united with one of the members of the clutch and caused to come into and out of frictional engagement with each other.

The known clutches of this type can practically only be constructed for larger powers or torques by increasing the diameter of the clutch, because the other factor which determines the value of the torque, viz: the force of compression can generally not be increased beyond a certain value. By reason of this, friction-clutches of the ordinary kind in use at the present time must be rather large and heavy and consequently also require considerable space, if constructed for greater torques. In addition to this, such clutches are connected with the disadvantage, that in released condition of the clutch the co-operating discs or rings will pass each other at a very small distance, so that a sliding between the frictional surfaces of said discs or rings will easily take place. The heat generated thereby may cause a deformation of said discs or rings, which again will frequently result in undue production of heat in the friction coverings and even in an entire destruction of the same.

These and further disadvantages, which are more fully dealt with below, will entirely be avoided by my present invention. According to my invention the discs or rings of the friction clutch are so constructed as to act upon each other in such a manner that the usual axially directed forces of compression are transformed into radially acting forces, by means of which the cylindrical surfaces of the discs or rings, which come into frictional engagement with a cylindrical surface of one body of the clutch, will be displaced in radial direction. This is accomplished according to my invention by having the several discs or rings constructed in the form of rings having a wedge-shaped cross-sectional conformation. More particularly, the oblique surfaces of adjacent discs or rings are alternately directed outwardly and inwardly, while the discs or rings of one set are provided with slots permitting an enlargement or contraction of the discs in radial direction.

In the drawing I have shown a clutch constructed according to my present invention, the figure of the drawing representing in its upper half a vertical section through the axis and in its lower half a side-view of the coupling according to my invention.

In the drawing the clutch is assumed to be electromagnetically operated, a gear-wheel 2 which is loosely mounted on the driving shaft 1 being either coupled to or uncoupled from said shaft. The magnet body 3 is fixedly mounted upon the shaft 1, said magnet body comprising an exciting winding 4. The exciting current is supplied to said exciting winding by means of slip-rings 5. The magnet body is furthermore provided at its outer circumference with spline keys 6 which are fastened thereon in axial direction, said spline keys 6 serving to guide the interior set of friction discs or rings 7, in such a manner that said friction discs or rings 7 may be displaced with respect to the magnet body 3 in axial direction but not in circumferential direction. The exterior set of friction discs or rings 8 is constructed with a greater diameter and the several discs or rings 8 of this set will alternate with the several discs or rings 7 of the other set. The discs or rings of both sets are of wedge-shaped cross-sectional conformation the wedge surfaces of the outer rings 8 being convergent in inward direction and the wedge surfaces of the interior discs or rings 7 being convergent in outward direction. The angles of inclination of co-operating wedge surfaces are the same so that the friction surfaces of each ring or disc will fully come into frictional engagement with the friction surfaces of the adjacent ring of the other set. The outer rings 8 are provided each with a slot in the manner of piston rings, so that the diameter of said rings 8 may be enlarged. In order to enlarge the diameter of the rings 8 only the natural resiliency of the latter must be overcome. The outer cylindrical surfaces of the rings 8 are provided with especial frictional coverings, as indicated at 9, said coverings consisting preferably of artificial resin, impregnated fibrous material or the like. These coverings may of course also consist of another material, such as for instance metal. The rings 7 and 8 may preferably consist of copper, bronze or another suitable metal.

The entire system of discs or rings 7 and 8 is enclosed by a bell-shaped housing 10 which forms an extension of the hub which is rotatably mounted upon the shaft 1 by means of the sleeve or bushing 16 and carries the gear-wheel 2. The annular gap between the magnet body 3 and the bell-shaped housing 10 is closed by an annular disc 11 fixed to the magnet body 3 and extending closely to the cylindrical part of the housing 10, a narrow gap being left between said housing and said annular disc, as shown in the drawing. The interior surface of the bell-shaped housing 10 serves as the frictional surface which engages the rings or discs 8. Opposite the right-hand end of the magnet body 3 there is provided the armature 12, which is mounted displaceably in axial direction on the shaft 1 by means of a sleeve or bushing 13. By means of the helical springs 15 and the bolts 14, which are mounted within proper bores of the magnet body as shown in the drawing, the armature 12 during inoperative condition of the magnet body will be kept away from the latter.

The mode of operation of the clutch according to my invention is as follows: If the exciting winding is supplied with current, the armature 12 will be attracted and its outer rim which projects slightly in inward direction will be pressed against the system of discs, the annular disc 11 serving as an abutment therefor. By the action of the wedge-shaped discs or rings the axially directed forces of compression will be transformed into radially directed forces of compression which will cause to increase the diameter of the discs or rings 8 and therewith bring about a radial displacement of the periphery of said discs in the direction towards the interior surface of the cylindrical part of the bell-shaped housing 10. The frictional coverings 9, which are provided on the periphery of the discs or rings 8, will come into engagement with the said interior surface of the cylindrical part of the housing 10 and thus cause the coupling to become operative. By properly choosing the angles of inclination of co-operating surfaces of the rings 7 and 8 the ratio of transmission between the axially and the radially acting forces of compression may be varied within large limits as desired, said radially acting forces of compression effecting the frictional pressure by which the coupling is rendered operative.

As compared with clutches having lateral frictional contact, my clutch has the advantage of superior air cooling of the rubbing surfaces due to a greater linear velocity of said surfaces through the intervening layer of air when said surfaces are out of contact with each other.

As a further advantage of the clutch according to my present invention it may be noted that the clutch according to my invention may be more cheaply manufactured, which is due to the above-mentioned fact, that the diameter of the clutch may be essentially reduced for a given power. It is immaterial, whether the frictional coverings are provided at the outer surface of the interior body of the clutch or at the interior surface of the housing 10 which encloses said body. The latter arrangement of the frictional coverings may eventually be preferred, because in this case the action of centrifugal force, which is exerted upon the frictional coverings, will be suppressed.

I claim:

1. In a friction clutch a revolvably mounted inner cylindrical body, a set of unsplit rings, laterally tapered at the outer periphery thereof, revolvably fixed and axially slidable with relation to said body, encompassing the periphery of said body, an abutment member on said body at one end thereof, a set of split rings, laterally tapered at the inner periphery thereof, encompassing said set of unsplit rings, said split rings being positioned alternately with the unsplit rings and the tapered parts of the rings in each set being adjacent the tapered parts of the rings in the other set and disposed to come into contact therewith, a cylindrical shell, encompassing said set of split rings and normally having an annular clearance therebetween and the peripheries of said split rings, and a means for pressing said unsplit rings in the direction of said abutment member, thereby expanding said split rings in a radial direction and bringing their outer peripheries into engagement with said shell at the inner surface of the latter.

2. In a friction clutch a revolvably mounted inner cylindrical body, a set of unsplit rings laterally tapered at the outer periphery thereof, in spline sliding engagement with the periphery of said body, an abutment member on said body at one end thereof, a set of split rings laterally tapered at the inner periphery thereof, encompassing said set of unsplit rings, the split rings being positioned alternately with the unsplit rings, and the tapered parts of the rings in each set being adjacent the tapered parts of the rings in the other set and disposed to come into contact therewith, a cylindrical shell encompassing said set of split rings and normally having an annular clearance therebetween and the outer peripheries of said split rings, and a means for pressing said unsplit rings in the direction of said abutment member, thereby expanding said split rings in a radial direction and bringing their outer peripheries into engagement with said shell at the inner surface thereof.

3. In a friction clutch a revolvably mounted cylindrical electromagnetic body, a set of unsplit rings, laterally tapered at the outer periphery thereof, encompassing the periphery of said body, a set of split rings, laterally tapered at the inner periphery thereof, encompassing said first mentioned set, the rings of each set being alternately positioned with relation to the rings of the other set and having their tapered parts disposed to come into contact with the corresponding parts of the rings of the other set, a cylindrical shell encompassing said last mentioned set of rings and normally having a clearance therebetween, an armature revolvably fixed and axially slidable with relation to said body and positioned at one end of said body and having thereon a part disposed to come into lateral contact with said unsplit rings, an abutment member at the other end of said body and a means for magnetizing said body, thereby attracting said armature thereto and thereby pressing said unsplit rings in the direction of said abutment, whereby said split rings are expanded in a radial direction into engagement with the inner surface of said shell.

4. In a friction clutch a revolvably mounted cylindrical electromagnetic body, a shaft for mounting said body thereon, a set of unsplit rings, laterally tapered at the outer rim thereof, encompassing the periphery of said body, a set of split rings, laterally tapered at the inner rim thereof, and encompassing said first mentioned set, the rings of each set being alternately positioned with relation to the rings of the other set and having their tapered parts disposed to come into contact with the corresponding parts of the rings of the other set, a cylindrical shell encompassing said last mentioned set of rings and normally having a clearance therebetween, an armature in spline sliding egagement with said shaft and positioned at one end of said body and having thereon a part disposed to come into lateral contact with said unsplit rings, an abutment member at the other end of said body, and means for magnetizing said body, thereby attracting said armature thereto and thereby pressing said unsplit rings in the direction of said abutment, whereby said split rings are expanded in a radial direction into engagement with the inner surface of said shell.

5. In a friction clutch a revolvably mounted cylindrical electromagnetic body, a set of unsplit rings laterally tapered at their outer rims and encompassing the periphery of said body, a set of split rings laterally tapered at their inner rims encompassing said first mentioned set, the rings of each set being alternately positioned with relation to the rings of the other set, said tapered parts of one set being disposed to come into lateral frictional contact with the tapered parts of the other set, a cylindrical shell encompassing said last mentioned set of rings and normally having a clearance therebetween, an armature revolvably fixed and axially slidable with relation to said body and positioned at one end of said body and having thereon a part disposed to come into lateral contact with said unsplit rings, an abutment member at the other end of said body, a resilient means for normally holding said armature with said part thereon out of contact with said unsplit rings and means for magnetizing said body, thereby attracting said armature thereto, in opposition to the force of said resilient means, and thereby pressing said unsplit rings in the direction of said abutment, whereby said split rings are expanded in a radial direction into engagement with the inner surface of said shell.

In testimony whereof I affix my signature.

BRUNO WITTKUHNS.